Figure 1:
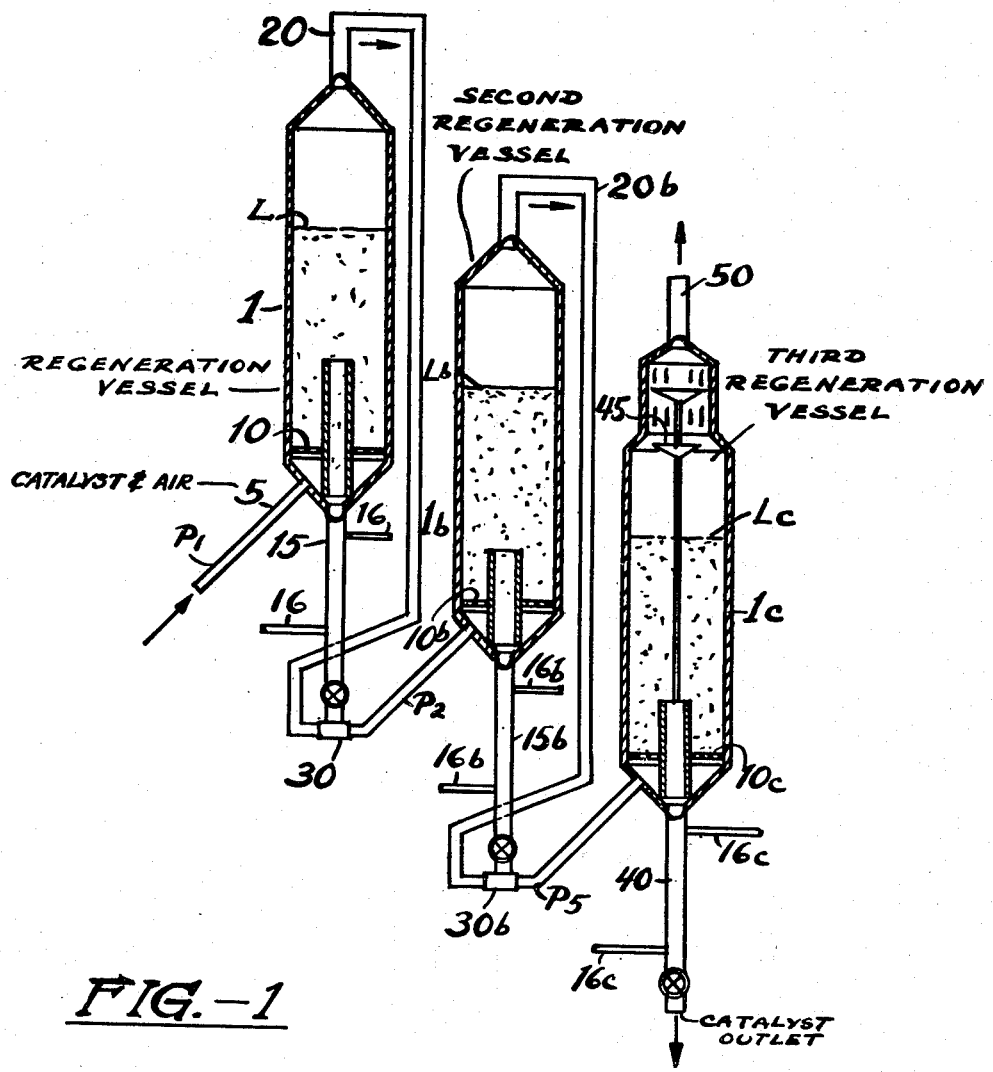

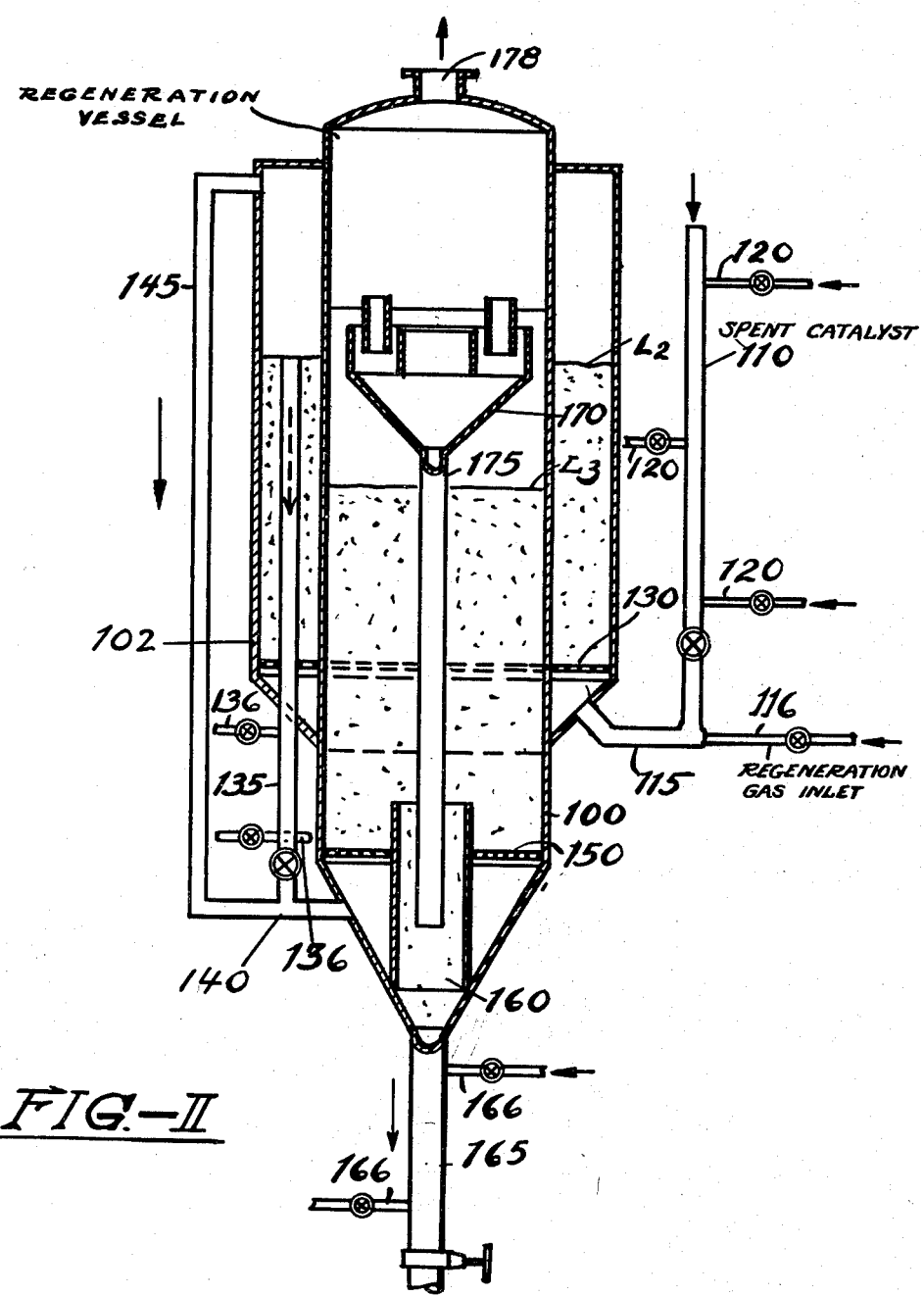

Sept. 21, 1948.    B. E. ROETHELI    2,449,622
MULTIPLE STAGE REGENERATION OF SPENT CATALYSTS
Filed May 15, 1943    4 Sheets-Sheet 3
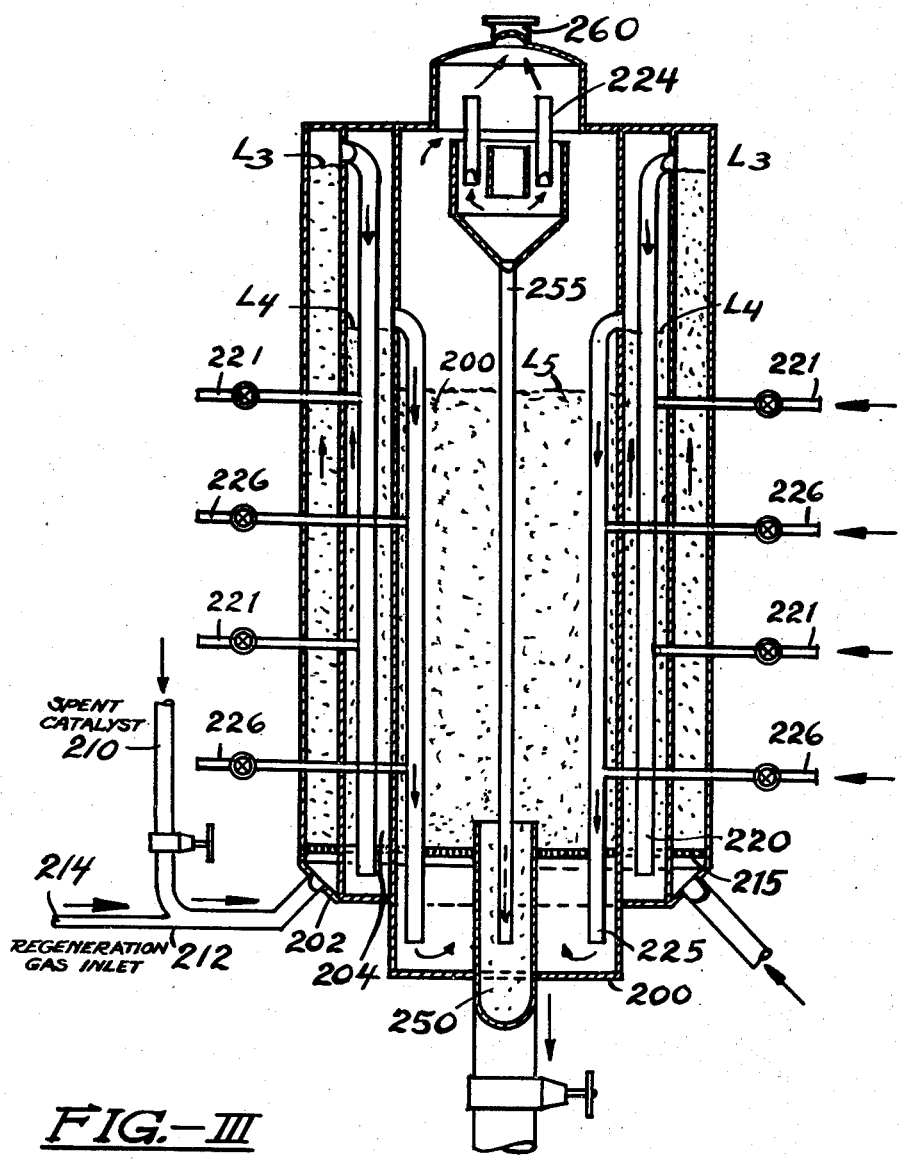
FIG.-III
Bruno E. Roetheli Inventor
By P. L. Young Attorney

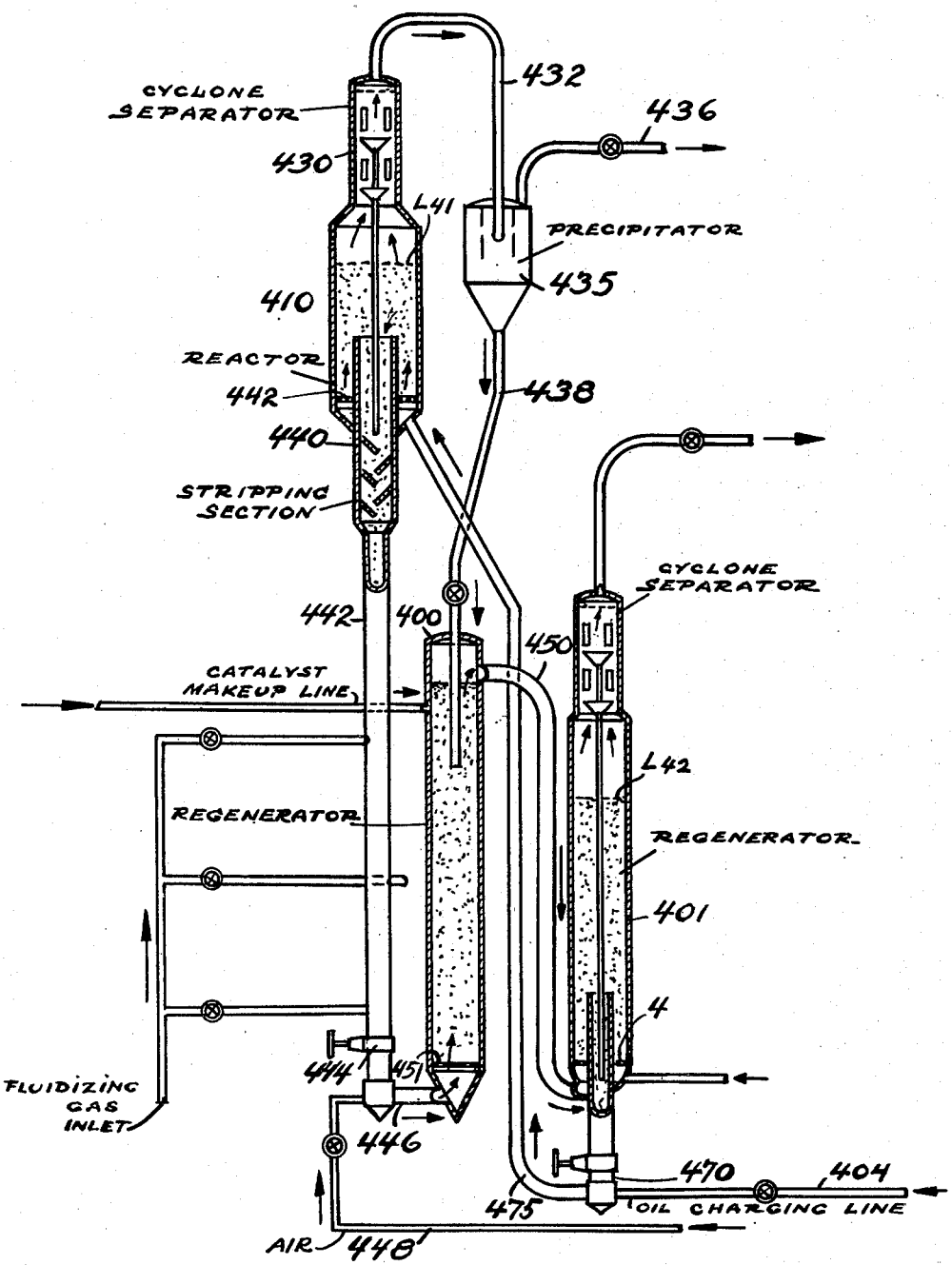

Patented Sept. 21, 1948

2,449,622

UNITED STATES PATENT OFFICE 2,449,622

MULTIPLE STAGE REGENERATION OF SPENT CATALYSTS

Bruno E. Roetheli, Cranford, N. J., assignor to Standard Oil Development Company, a corporation of Delaware Application May 15, 1943, Serial No. 487,188

5 Claims. (Cl. 252—242)

The present invention relates to improvements in the regeneration of solid contact or catalytic material, and more particularly, relates to improvements in the regeneration of that catalyst which, during the productive phase, becomes contaminated with carbonaceous deposits.

I have found that carbonized catalysts, that is, catalysts contaminated with carbonaceous deposits during their use in the reforming of naphthas, may be more cheaply and expeditiously regenerated by burning off the contaminants in a multi-stage regeneration operation than in a single stage. Stated otherwise, I have found that I may more economically regenerate a contaminated catalyst, but carrying only a relatively low amount of carbon, in stages, by regenerating the catalyst at successively higher temperatures in the several stages than in a single stage, by maintaining the conditions of regeneration so that the product of the burning rate (pounds of carbon burned per pound of carbon in the regeneration zone, per unit of time) multiplied by the pounds of carbon per pound of partly regenerated catalyst, is greater in any given stage than in the next succeeding stage. The full significance and meaning of the immediately preceding proposition will appear more fully in the ensuing description and claims.

In one modification of my invention I have applied my present improvements to the regeneration of a catalyst which has been contaminated during the reforming of naphthas, and for a better understanding of my invention, reference may be made to the accompanying drawings in which I have shown in Fig. I diagrammatically, apparatus in which catalyst may be regenerated in three stages; in Fig. II, I have shown a modification of my invention in which regeneration may be carried out in two stages but in a single vessel consisting essentially of an inner circular chamber in which the catalyst is partially regenerated in combination with an annular space which surrounds the inner chamber and forms a second regeneration chamber; in Fig. III, I have shown a third modification of apparatus in which my invention may be carried into effect and in this modification two annular chambers surround and are concentric with a central regeneration chamber, thus forming three separate regeneration chambers, and in Fig. IV, I have shown a fourth modification in which the regeneration is carried out in two vessels and is further characterized by the fact that the gas and catalyst are not separated between stages.

Referring in detail to Fig. I, the apparatus shown consists of three separate chambers through which catalyst to be regenerated is successively passed. In the type of operation in question, the catalyst enters the first of the regeneration chambers 1 through a line 5 carried in suspension in a moving gas containing free oxygen and then passes upwardly through a foraminous member 10 into regeneration vessel 1. The superficial velocity of the gas is fixed within the limits of 0.5 to 6 ft. per second and preferably at 0.5 to 3 ft. per second so as to cause within the regeneration vessel 1 the formation of a turbulent, fluidized mass of catalyst having a flowability approaching that of a liquid and actually resembling a boiling liquid in that it contains a myriad of vertical and criss-cross currents. The catalyst regeneration vessel is provided with a draw-off pipe 15 located at the bottom and projecting into the vessel at a point somewhat above the distributing plate 10. The gas which enters the vessel is, as stated, air or some other oxygen-containing gas which supports the combustion therein taking place. The fluidized, turbulent mass has, under the conditions stated, an upper dense phase level which I have indicated at L, above which the gas is much depleted in catalyst content and when operating at its best, the gas withdrawn through line 20 contains only a minimum quantity of the catalyst and that only of the finest particles; in other words, where the catalyst is of a size of from 200–400 mesh as it enters through line 5, it may be associated with extremely fine particles and some of these may be entrained in the gases in line 20. However, as shown in the drawing, the gases from the regeneration are discharged into pipe 30 which also receives the main body of the catalyst withdrawn through draw-off pipe 15, and the said gases cause the catalyst in 30 to be fluidized and then passed into the second regeneration chamber 1—b where again they pass upwardly through a foraminous member 10—b into the second regeneration chamber 1—b where the velocity of the gas is maintained within the range of 1–6 ft. per second, preferably 1½–3 ft. per second (as in chamber 1) in order to form, in this second regeneration chamber, a highly fluidized, turbulent mass of catalyst having an upper level at L—b. In regeneration vessel 1—b the catalyst undergoes further regeneration. The pressure at the point P—2 will be less than at P—1 where the fluidized catalyst entered regeneration zone 1. In vessel 1—b the catalyst undergoes further regeneration and it is then withdrawn through draw-off pipe 15—b and discharged into a second pipe 30—b where it is mixed with the gas withdrawn through 20—b overhead from second generation vessel 1—b, and this again causes fluidization of the catalyst and the fluidized mass is passed into the third regeneration vessel 1—c where again the velocity of the gas is (as in the previous stages) such as to form a fluidized, turbulent, dense mass of catalyst having an upper level at L—c. The catalyst undergoes final regeneration in regeneration vessel 1—c, and the regenerated catalyst is withdrawn through line 40.

The regeneration gases pass upwardly through solid gas contacting devices, such as centrifugal separators, Cottrell precipitators, etc. 45 where entrained fines are separated and these separators serve to remove the last traces of entrained fines from the catalyst and the catalyst free gases are removed through line 50.

In the operation which I have illustrated, the temperature conditions in the several regeneration vessels are different, the temperature in 1—c being greater than that in 1—b, and the temperature in 1—b being greater than that in 1. As to pressure conditions, the maximum pressure is in the line 5 and decreases progressively throughout the system so that, for example, the pressure at the point indicated at P—2 is greater than that at P—5, thus permitting continuous flow of catalyst throughout the system.

In order to facilitate flow of catalyst from pipes 15, 15—b and 40, they are provided with taps 16, 16—b and 16—c, respectively, through which taps gasiform material may be forced into the stream of descending catalyst.

In Fig. II, I have shown a unitary vessel, having, however, multiple effect and adapted for two stages of regeneration, the apparatus being designed so as to effect an economy in materials such as steel; thus, the vertical vessel 100 is encased by an annular jacket 102 to form two separate chambers, the outer wall of vessel 100 forming the inner wall of the second chamber 102. In this modification of my invention, the catalyst from some source is fed through a feed pipe 110 into a pipe 115 where it is mixed with a regeneration gas fed to the system through line 116. As before, the effect of the gas is to fluidize the powdered material and to impart to it the flow characteristics of a true fluid, such as liquid or a gas. The pressure in 110, which operates in the manner of a hydrostatic standpipe, for example, particularly when the catalyst therein is fluidized by means of a moving gas which, if introduced through taps 120, is greater than that at any other point in the system, and the combination of the fluidized catalyst plus the pressure developed at the bottom of pipe 110 forces the catalyst into the annular chamber 102 through the foraminous member 130. By regulating the net velocity of the gas to a value within the range of from 0.5 to 6 ft. per second, or preferably 0.5 to 3 ft. per second where the catalyst is of a size of from 200–400 mesh, I form within the annular space 102 a turbulent, fluidized mass of catalyst having an upper level at L—2, similar in all respects to the fluidized mass I described in connection with the operation of Fig. I.

In annular space 102 the catalyst undergoes partial regeneration and the partially regenerated catalyst is withdrawn through a draw-off pipe 135 into a mixer 140. Meanwhile, the gases above L—2 in annular space 102, which gases are largely depleted of catalyst, are withdrawn through a draw-off pipe 145 and remixed with the catalyst in pipe 140 where they serve to fluidize the said catalyst. The fluidized catalyst in 140 is then conducted through the foraminous plate or member 150 into the inner regeneration chamber 100 where again the flow conditions are regulated so as to produce a fluidized, turbulent mass of catalyst having an upper level at L—3. The catalyst in chamber 100 undergoes further regeneration and is withdrawn through draw-off pipe 160 for use in some process such as hydroforming or cracking. Any catalyst which is entrained in the gases in the upper portion of the chamber 100 is substantially removed by passing through a solid-contacting device 170 which may be electrical precipitators or centrifugal separators, which precipitators and separators serve to separate entrained fines and the separated catalyst then gravitates through a dip pipe 175 into the draw-off pipe 160. The regeneration gases are rejected from the system through line 178, thus completing the series of operations. In order to increase the fluidity of the catalyst flowing downwardly in pipe 135, I force a gas through taps 136 into said downflowing pipe. Similarly, draw-off pipe 165 is provided with taps 166, through which taps gasiform material may be injected in order to facilitate the flow of catalyst through said pipe.

In the modification shown in Fig. III, I have provided an extension of the concept illustrated in Fig. II, in that I provide a central chamber 200 surrounded by two additional chambers 202 and 204, respectively. In the operation of this device, the contaminated catalyst powder is fed from line 210 into pipe 212 where it mixes with regeneration gas from 214 which regeneration gas causes fluidization of the powder and the fluidized mass then passes into the outer annular chamber 202 through a grid 215 and into a portion above the grid, eventually reaching the level L—3. At this level it flows with the gas into the second or intermediate chamber through a suitable tubular or annular passage 220 and then passes upwardly into chamber 204 until it reaches a level L—4 whereupon it overflows through a suitable tubular or annular passage 225 and finally passes into the innermost of the chambers 200. In the latter chamber the catalyst froms a turbulent mass which has an upper level at L—5. However, the gas velocity in the three chambers 200, 202 and 204 is of the order of 0.5–6 ft. per second, and preferably 0.5–3 ft. per second, and in each chamber a fluidized mass of catalyst is present.

The catalyst undergoes progressive regeneration through the several stages, the pressure decreasing through the stages and the temperature increasing. The regenerated catalyst is finally withdrawn from the innermost chamber in the desired regenerated condition through line 250. The spent regeneration gas passes upwardly in chamber 200 into one or more solid gas contacting devices which may be electrical precipitators and centrifugal separators 224, which precipitators and separators serve to separate entrained fines and the latter are conveyed by dip pipe 255 to draw-off pipe 250, the spent gases being finally withdrawn from the system through line 260. Here, also, in order to facilitate the flow of catalyst, I provide a plurality of taps 221 projecting into the tubular or annular space 220 through which taps gasiform material is forced in order to facilitate the flow of material therein. Similarly, tubular or annular space 225 is provided with a plurality of taps 226 to facilitate the flow of catalyst therethrough. It will be understood that in this modification as well as in the others the number of taps necessary to supply the proper amount of gas may vary from 2 to 6, more or less. The presence of a gas moving countercurrently upwardly against the downflowing powdered catalyst serves, as indicated, to increase the fluidity thereof.

In the modification shown in Fig. IV, the regeneration is carried out in two vessels 400 and 401, the mixture of gas and catalyst flowing unseparated from 400 into 401.

However, in order to show more clearly how my process is adapted for commercial operation, I have included in this modification a reactor 410 which, as can be seen, is somewhat elevated above the regeneration vessels 400 and 401. In the operation of the process, the preheated oil is conveyed from charging line 404 wherein it is mixed with regenerated catalyst from line 470, via line 475 into the reaction zone, having a grid 442, in which zone the oil vapors and the catalyst form a dense, fluidized mass by limiting the superficial linear velocity of the gases in the reactor within the range of from ½ to 3 feet per second causing the formation of the aforesaid fluidized mass which will have an upper level at L—41. The vapors and catalyst remain in contact with each other for a sufficient period of time to effect the desired conversion and then pass upwardly through the cyclone separators 430. The vapors passing through the cyclone separators 430 are freed of the main bulk of catalyst contained therein. However, in order to insure complete removal, the vapors withdrawn from the separators through line 432 pass into an electrical precipitator 435 from which the last traces are substantially removed, whereupon the vapors are then passed through line 436 and delivered through condensing and finishing equipment to recover the desired products. The catalyst separated in separator 435 is conveyed by line 438 into the regeneration vessel 400. The main bulk of the catalyst in reactor 410 is withdrawn through a bottom draw-off 440 and thence conveyed by means of a standpipe 442 carrying a flow control valve 444 into an inlet pipe 446 together with air from line 448 into regeneration vessel 400 where it passes upwardly through a foraminous member 451 into said regeneration vessel 400. As before, the velocity of the gases is controlled within the limits of ½ to 6 feet and preferably from ½ to 3 feet per second so as to form a fluidized mass of catalyst within the regeneration vessel. The catalyst undergoes regeneration by burning of the contaminants as hereinbefore described in the other modifications, but here the catalyst and the gas, without substantial separation from each other, pass through a pipe 450 into the second regeneration vessel 401, which is of the same general shape as the first vessel but somewhat smaller in volume, as shown. Here, also, the gas velocity is regulated within the range of ½ to 6 feet per second and preferably from ½ to 3 feet per second so as to form a dense, fluidized mass having an upper level L—42.

The regenerated catalyst is withdrawn from regenerator 401 through bottom draw-off pipe 470 and returned via pipe 475 to reactor 410, as previously indicated.

To illustrate my invention further, I shall set forth a specific application thereof as applied to the regeneration of a "reforming" catalyst, i. e., a catalyst consisting of a minor proportion of molybdenum oxide supported on activated alumina, employed in the reforming of naphthas to improve their octane number. This catalyst becomes contaminated with carbonaceous deposits during use and must be regenerated.

Thus, a certain reforming catalyst was found to have low activity when it contained 0.0043 lb. of carbonaceous material per pound of catalyst. When this material was regenerated at regeneration gas (oxygen-containing gas) inlet temperature of 900° F. and a catalyst temperature averaging 1100° F. during regeneration, with 2% excess oxygen (by volume) in the gas leaving the regeneration vessel, it was found that the regeneration required a volume of 4100 cu. ft. to reduce the carbonaceous content to 0.0020 lb./lb. of catalyst.

The same amount of the same catalyst was regenerated in two stages. In the first stage, the average catalyst temperature during regeneration was 1060° F. and in the second stage it was 1100° F., the exit gas from the second stage having 2% excess oxygen (by volume). The first stage of regeneration required a volume of 2900 cubic feet and the second 800 cubic feet, a total of 3700 cubic feet. The catalyst was regenerated to the same extent in the two-stage operation as in the foregoing single stage process.

The advantage of employing the two-stage operation therefore is that a saving of about 10% in volume is achieved. In a large scale commercial unit this saving would amount to tons of steel and other structural materials.

Another advantage is that in the two-stage operation the catalyst temperature is lower in a substantial portion of the equipment during regeneration and an economy may be effected in insulation requirements and critical materials such as alloys, etc.

In particular, my process is valuable in pressure regeneration, i. e., where the regeneration is carried out under superatmospheric pressure. Assume in catalytic cracking using a reactor such as 410 of Fig. IV, that the volume of reactor was 1200 cubic feet. If the gas velocity is 1 foot per second (a good value), the reactor would be 1200 sq. ft. in area. Now if hydroforming is performed in reactor 410, the pressure may be of the order of 20 atmospheres or 300 lbs./sq. in., a commonly used pressure for this reaction. Now, if the linear velocity of the reactants is 1 ft. per second, the area will be only 60 sq. ft. because $$\frac{1200}{20} = 60$$

the vapors having a volume of 1200 cubic feet at 1 atmosphere, compressed to 20 atmospheres, would occupy a gas volume of 60 cubic feet. Now, if 12,000 cubic feet of volume is required for regeneration of the catalyst, a single regeneration vessel would have to be 200 feet high $$\left(\frac{12000}{60}\right)$$

As shown previously, economy of regeneration volume (in particular, height) could be achieved by using stage regeneration. If two stages, for example, are employed, the first stage need only be 70 feet high, while the second would be somewhat less. Hence, where the cross-section area of both stages of the regenerators was 60 sq. ft., the combined height of both stages would be less than 140 ft.

While I have illustrated my invention as applied to regenerating a catalyst having a relatively low carbonaceous content, it is also useful where the contamination is high, say up to 5% by weight of the catalyst, and it is desired to reduce the carbonaceous content to about 1%. In other words, my invention has particular utility where the percentage reduction in carbonaceous content of the fouled catalyst must be high, say of the order of magnitude of 60-99%. The lower limit being, of course, variable according to the specific burning characteristics of the catalyst in question.

To recapitulate briefly, my present improvements relate to a multi-stage process for regenerating a catalyst contaminated with carbonaceous or other combustible deposits characterized by the feature that the catalyst is progressively forced through the consecutive chambers where it is maintained in a turbulent, fluidized state and being further characterized by the feature that in the successive stages of the operation the temperature is progressively increased. During this multiple effect process I am enabled to regenerate catalysts of relatively low carbonaceous content to the required degree, by operating in such a manner that the catalyst "hold-up" is much less, that is to say, by using several chambers rather than a single chamber for the regeneration operation, the height of the chambers need not be excessively high as would be necessary where a single chamber regeneration were operated at superatmospheric pressure. In other words, in using the type of reaction chamber herein described, which may be called the "hindered settler" type, and regenerating under superatmospheric pressure, the difficulty arises of providing sufficient quantities of gas to attain suitable linear velocities in the chamber to lift the solid particles and obtain good mixing. As indicated, if a single chamber is used, the chamber must be very high, but by using the multi-stage operation herein described, the chambers need not be excessively high.

What I claim is:

1. In the regeneration of powdered catalyst materials contaminated with at most about 1% by weight of carbonaceous deposits the method which comprises passing a mixture of said contaminated catalyst and the total amount of oxygen-containing gas necessary for regeneraation of the contaminated catalyst at elevated temperatures and pressures into a first regeneration zone, regulating the linear velocity of said oxygen-containing gas to form a highly fluidized turbulent bed of catalyst in the lower portion of said zone, withdrawing catalyst particles and regeneration gases from said first regeneration zone and passing said withdrawn catalyst particles and regeneration gases into another regeneration zone maintained at a pressure which is lower than that of the first regeneration zone and in which the catalyst is maintained at a higher temperature than in said first regeneration zone and regulating the linear velocity of the regeneration gases passing through said second regeneration zone to form a highly fluidized turbulent bed of catalyst particles in the lower portion of the latter regeneration zone.

2. The process as defined in claim 1 wherein the catalyst and regeneration gases are withdrawn separately from the first regeneration zone and are then intimately intermixed in a mixing zone and introduced into the second regeneration zone.

3. The process as defined in claim 1 wherein the conditions of regeneration are maintained such that the product of the burning rate (pounds of carbon burned per pound of carbon in the regeneration zone per unit of time) multiplied by the pounds of carbon per pound of partially regenerated catalyst is greater in the first zone than in the next succeeding zone.

4. The process as defined in claim 1 wherein all of the regeneration gas is passed through each of the regeneration zones and the regeneration gas withdrawn from the final regeneration zone contains at most about 2% of oxygen.

5. The process as defined in claim 1 wherein the regeneration zones are arranged concentrically and a pressure due to the hydrostatic head of the fluidized catalyst is imposed thereby causing the catalyst to flow through the regeneration zones.

BRUNO E. ROETHELI.

REFERENCES CITED

The following references are of record in the file of this patent:

UNITED STATES PATENTS

| Number | Name | Date |
|---|---|---|
| 1,984,380 | Odell | Dec. 18, 1934 |
| 2,199,838 | Tyson | May 7, 1940 |
| 2,273,076 | Voorhees | Feb. 17, 1942 |
| 2,311,564 | Munday | Feb. 16, 1943 |
| 2,320,273 | Gohr et al. | May 25, 1943 |
| 2,367,351 | Hemminger | Jan. 16, 1945 |
| 2,378,342 | Voorhees et al. | June 12, 1945 |
| 2,379,408 | Arveson | July 3, 1945 |
| 2,419,245 | Arveson | Apr. 22, 1947 |
| 2,420,632 | Tyson | May 13, 1947 |